(12) United States Patent
Ogawa et al.

(10) Patent No.: US 11,573,144 B2
(45) Date of Patent: Feb. 7, 2023

(54) PRESSURE DETECTOR WITH IMPROVED DETERIORATION PROTECTION

(71) Applicant: NAGANO KEIKI CO., LTD., Tokyo (JP)

(72) Inventors: Masashi Ogawa, Tokyo (JP); Atsushi Imai, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 0 days.

(21) Appl. No.: 17/489,219

(22) Filed: Sep. 29, 2021

(65) Prior Publication Data

US 2022/0107233 A1   Apr. 7, 2022

(30) Foreign Application Priority Data

Oct. 1, 2020   (JP) .............................. JP2020-166695

(51) Int. Cl.
*G01L 9/00* (2006.01)
*G01L 19/00* (2006.01)

(52) U.S. Cl.
CPC ........ *G01L 9/0072* (2013.01); *G01L 19/0069* (2013.01)

(58) Field of Classification Search
None
See application file for complete search history.

(56) References Cited

U.S. PATENT DOCUMENTS

| 5,207,103 A * | 5/1993 | Wise ..................... G01L 9/0042 361/283.4 |
| 2012/0197155 A1* | 8/2012 | Mattes ................... A61N 1/056 600/561 |

FOREIGN PATENT DOCUMENTS

| DE | 102018104162 A1 | 8/2019 |
| JP | 2000-356563 | 12/2000 |
| WO | 2004/057291 A1 | 7/2004 |

OTHER PUBLICATIONS

European Search Report dated Feb. 28, 2022, 9 pages.

* cited by examiner

*Primary Examiner* — Lisa M Caputo
*Assistant Examiner* — Nigel H Plumb
(74) *Attorney, Agent, or Firm* — Rankin, Hill & Clark LLP

(57) ABSTRACT

A pressure detector includes a first board with a first pressure inlet, a first groove, and a first board electrode; a second board with a second pressure inlet, a second groove, and a second board electrode; and a sensing unit arranged therebetween with a diaphragm. The first groove is in communication with the first pressure inlet so as to prevent the formation of a closed space between the first board and the diaphragm when they contact with each other. The second groove is in communication with the second pressure inlet so as to prevent the formation of a closed space between the second board and the diaphragm when they contact each other.

3 Claims, 5 Drawing Sheets

PRESSURE DETECTOR WITH IMPROVED DETERIORATION PROTECTION

The entire disclosure of Japanese Patent Application No. 2020-166695 filed Oct. 1, 2020 is expressly incorporated by reference herein.

TECHNICAL FIELD

The present invention relates to a pressure detector.

BACKGROUND ART

A capacitance pressure detector 100 as shown in FIG. 4 has been known. The pressure detector 100 shown in FIG. 4 includes a first board 120, a second board 130, and a sensing unit 140. The first board 120 includes a first board body 121 shaped in a plate, a first board electrode 122 provided on a surface of the first board body 121 facing the sensing unit 140, and a first pressure inlet 123 penetrating through the first board body 121. The second board 130 includes a second board body 131 shaped in a plate, a second board electrode 132 provided on a surface of the second board body 131 facing the sensing unit 140, and a second pressure inlet 133 penetrating through the second board body 131. The sensing unit 140 includes a plate-shaped diaphragm 141, a first diaphragm electrode 142 provided on a surface of the diaphragm 141 facing the first board body 121, a second diaphragm electrode 143 provided on a surface of the diaphragm 141 facing the second board body 131, and a bonding portion 144 bonded with the first board body 121 and the second board body 131.

As shown in FIG. 5, the diaphragm 141 of the pressure detector 100 is configured to be brought into contact with the first board electrode 122 disposed on the first board body 121 when an excessive pressure or negative pressure is applied on the diaphragm 141, thereby keeping the diaphragm 141 from being damaged by the excessive pressure or negative pressure.

When the diaphragm 141 and the first board electrode 122 of the pressure detector 100 as shown in FIGS. 4 and 5 are brought into contact to each other to form a closed space. Subsequently, even when the excessive pressure or negative pressure is released, a pressure difference, which is caused between the closed space and an outside, keeps the diaphragm 141 and the first board electrode 122 to be in tight contact as shown in FIG. 5 and hinders immediate separation, thereby deteriorating responsiveness.

A pressure detector disclosed in Patent Literature 1 (JP 2000-356563 A) is an example of a known technique capable of preventing such deterioration in the responsiveness caused by the tight contact between the diaphragm and the electrode.

The pressure detector disclosed in Patent Literature 1 includes a plurality of pressure inlets in each of the two boards. Accordingly, the closed space is not formed even when the diaphragm and the electrode are brought into contact with each other, so that the pressure difference is not caused to avoid the tight contact between the diaphragm and the electrode, thereby restraining the deterioration in responsiveness.

However, the pressure detector disclosed in Patent Literature 1, which requires the presence of the plurality of pressure inlets in the boards, reduces an effective area of the electrode, failing to achieve maximum detection sensitivity.

SUMMARY OF THE INVENTION

An object of the invention is to provide a pressure detector capable of restraining deterioration in responsiveness and reduction in detection sensitivity.

A pressure detector according to an aspect of the invention includes: a sensing unit including a plate-shaped diaphragm, a first diaphragm electrode provided on one surface of the diaphragm, a second diaphragm electrode provided on the other surface of the diaphragm, and a bonding portion provided on a peripheral portion of the diaphragm; a first board including a first board body shaped in a plate and bonded to one surface of the bonding portion of the sensing unit and a first board electrode provided on a surface of the first board body facing the first diaphragm electrode; and a second board including a second board body shaped in a plate and bonded to the other surface of the bonding portion of the sensing unit and a second board electrode provided on a surface of the second board body facing the second diaphragm electrode, in which the first board body includes a first pressure inlet penetrating through the first board body and a first groove provided on the surface facing the first diaphragm electrode, the first groove being in communication with the first pressure inlet, and the second board body includes a second pressure inlet penetrating through the second board body and a second groove provided on the surface facing the second diaphragm electrode, the second groove being in communication with the second pressure inlet.

In the above aspect of the invention, the first board body is formed with the first groove, which is in communication with the first pressure inlet, on the surface facing the first diaphragm electrode. Thus, even when an excessive pressure or negative pressure is applied on the diaphragm through the first pressure inlet or the second pressure inlet to bring the first diaphragm electrode of the diaphragm into contact with the first board electrode of the first board, a closed space is not formed between the first diaphragm electrode and the first board body provided with the first board electrode. Accordingly, failure in immediate separation of the first diaphragm electrode from the first board electrode and consequent deterioration in responsiveness can be restrained.

Similarly, according to the above aspect of the invention, since the second groove in communication with the second pressure inlet is formed on the surface of the second board body facing the second diaphragm electrode, a closed space can be prevented from being formed between the second diaphragm electrode and the second board body provided with the second board electrode. Accordingly, failure in immediate separation of the second diaphragm electrode from the second board electrode and consequent deterioration in responsiveness can be restrained.

Further, according to the above aspect of the invention, since the presence of the plurality of pressure inlets in each of the first board and the second board as disclosed in Patent Literature 1 is not required, decrease in an effective electrode area by the plurality of pressure inlets can be avoided. Accordingly, deterioration in detection sensitivity can be restrained.

Further, when the pressure detector disclosed in Patent Literature 1 is miniaturized, an area to be fixed with an adhesive is not easily ensured and the pressure inlet(s) arranged along a periphery of the sensing unit is clogged to deteriorate responsiveness. In contrast, according to the above aspect of the invention, since the presence of the plurality of pressure inlets is not required, a sufficient adhesion area can be ensured even when the pressure detector is miniaturized.

In the pressure detector according to the above aspect of the invention, it is preferable that the first groove is covered with the first board electrode, and the second groove is covered with the second board electrode.

In the above arrangement, since the first groove and the second groove of the first board and the second board, respectively, are covered with respective electrodes, the parts corresponding to the first groove and the second groove can be effectively utilized. Accordingly, decrease in effective electrode area due to the presence of the first groove and the second groove can be restrained.

In the pressure detector according to the above aspect of the invention, it is preferable that the first groove linearly extends from the first pressure inlet to a portion of the first board bonded with the bonding portion, and the second groove linearly extends from the second pressure inlet to a portion of the second board bonded with the bonding portion.

According to the above arrangement, since the first groove and the second groove are linearly formed, the formation of the first groove and the second groove is easy.

DESCRIPTION OF EMBODIMENT(S)

Exemplary Embodiment

An exemplary embodiment of the invention will be described below with reference to the attached drawings.

Figure 1:
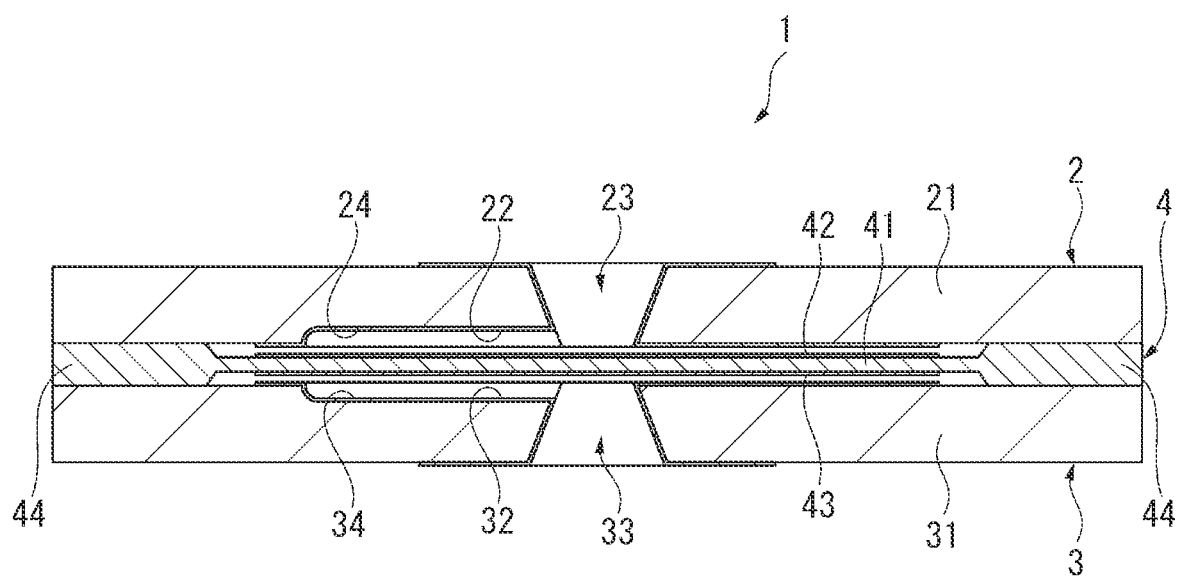
FIG. 1 is a cross-sectional view schematically showing a pressure detector according to an exemplary embodiment.
Figure 2:
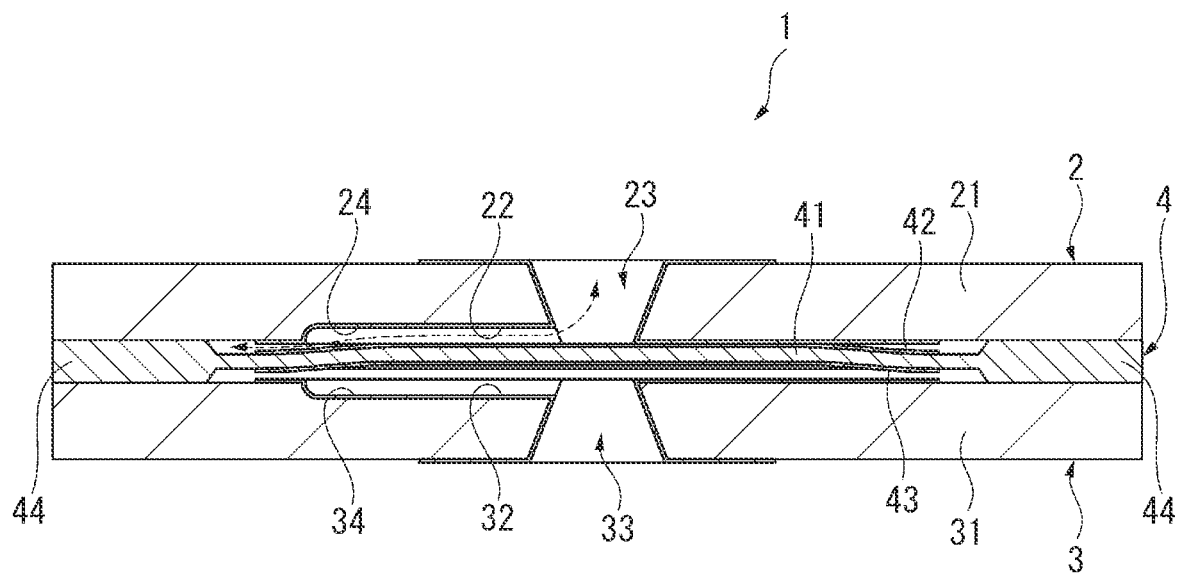
FIG. 2 is another cross-sectional view schematically showing the pressure detector according to the exemplary embodiment.

FIGS. 1 and 2 are cross-sectional views schematically showing a pressure detector 1 according to the exemplary embodiment.

As shown in FIGS. 1 and 2, the pressure detector 1 according to the exemplary embodiment is a capacitance pressure detector, which includes a first board 2, a second board 3, and a sensing unit 4.

First Board 2

Figure 3:
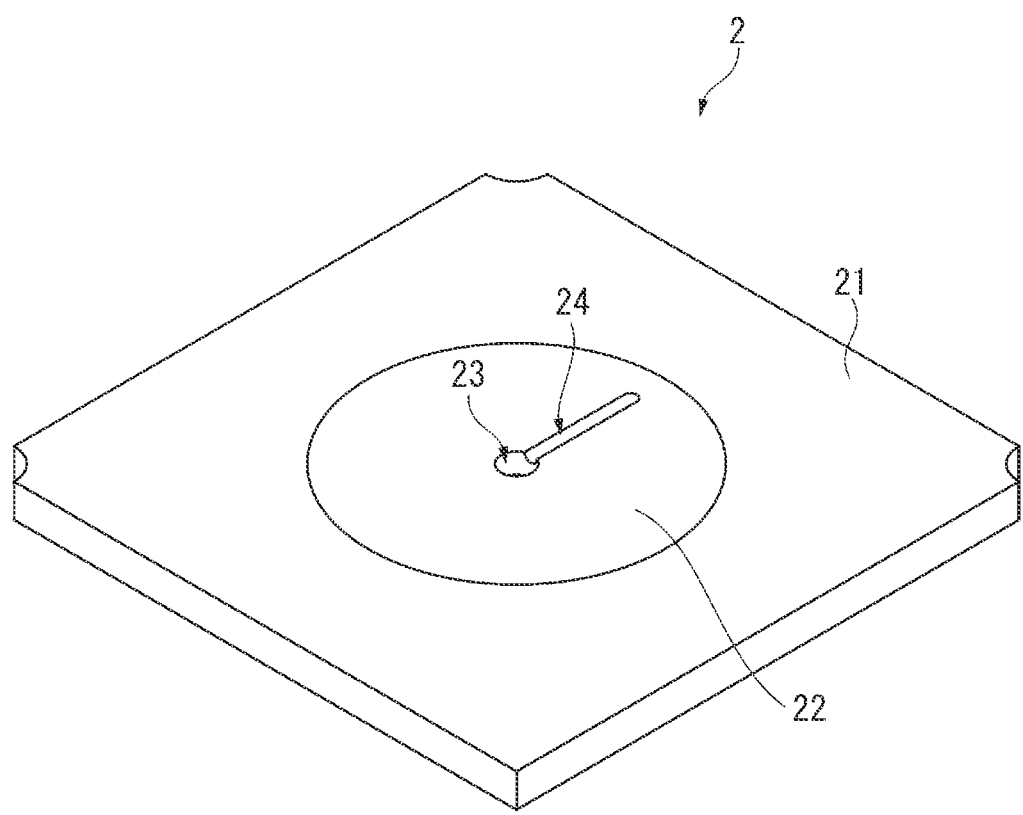
FIG. 3 is a perspective view schematically showing a first board according to the exemplary embodiment.
Figure 4:
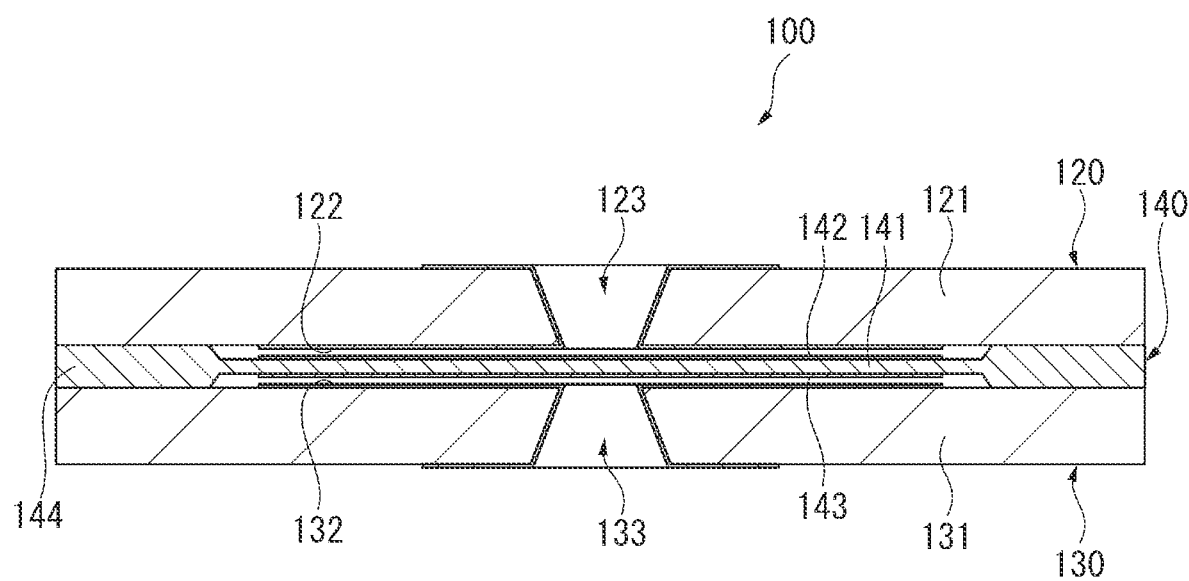
FIG. 4 is a cross-sectional view schematically showing a typical pressure detector.
Figure 5:
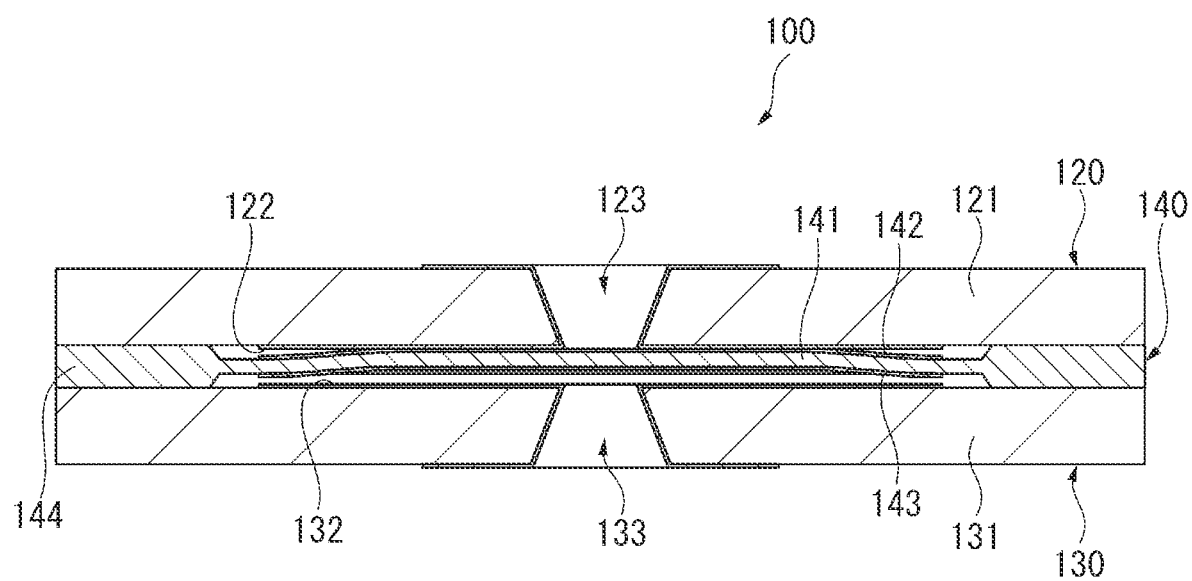
FIG. 5 is another cross-sectional view schematically showing the typical pressure detector.

FIG. 3 is a perspective view schematically showing the first board 2. It should be noted that the perspective view of FIG. 3 shows the first board 2 seen from an inner side (the side facing the sensing unit 4) of the pressure detector 1. It should also be noted that the second board 3 is symmetric with the first board 2 across the sensing unit 4.

As shown in FIGS. 1 to 3, the first board 2 includes a first board body 21 and a first board electrode 22.

The first board body 21 is a plate-shaped component made of an insulating material (e.g. glass). The first board electrode 22, which is configured to generate capacitance between the sensing unit 4 and the first board electrode 22, is provided on a surface of the first board body 21 facing the sensing unit 4. In the exemplary embodiment, the first board electrode 22 is a metal vapor deposition film patterned by photolithography.

Further, a first pressure inlet 23 penetrating through the first board body 21 is provided at the center of the first board body 21. In the exemplary embodiment, the first pressure inlet 23, which is trapezoidal in cross section, is tapered from an outer side to the inner side.

Further, in the exemplary embodiment, a first groove 24 in communication with the first pressure inlet 23 is formed on the surface of the first board body 21 facing the sensing unit 4. Specifically, the first groove 24 linearly extends from the first pressure inlet 23 to a portion bonded with a later-described bonding portion 44 of the sensing unit 4. The first groove 24 is formed in the first board body 21 through some kind of processing (e.g. etching by photolithography), for instance.

In the exemplary embodiment, the first pressure inlet 23 and the first groove 24 are covered with the first board electrode 22.

Second Board 3

As described above, the second board 3, which is symmetric with the first board 2 across the sensing unit 4 as described above, includes a second board body 31 and a second board electrode 32.

The second board body 31 is a plate-shaped component made of an insulating material (e.g. glass). The second board electrode 32, which is configured to generate capacitance between the sensing unit 4 and the second board electrode 32, is provided on a surface of the second board body 31 facing the sensing unit 4. In the exemplary embodiment, the second board electrode 32 is a metal vapor deposition film patterned by photolithography.

Further, a second pressure inlet 33 penetrating through the second board body 31 is provided at the center of the second board body 31. In the exemplary embodiment, the second pressure inlet 33, which is trapezoidal in cross section, is tapered from an outer side to the inner side.

Further, in the exemplary embodiment, a second groove 34 in communication with the second pressure inlet 33 is provided on the surface of the second board body 31 facing the sensing unit 4. Specifically, the second groove 34 linearly extends from the second pressure inlet 33 to the portion bonded with the later-described bonding portion 44 of the sensing unit 4. The second groove 34 is formed in the second board body 31 by some kind of processing (e.g. etching by photolithography), for instance.

In the exemplary embodiment, the second pressure inlet 33 and the second groove 34 are covered with the second board electrode 32.

Sensing Unit 4

The sensing unit 4 is a component made of an electroconductive silicon material of a predetermined thickness, a central part of which is thinned by a processing (e.g. etching by photolithography) to form a diaphragm 41. Specifically, the sensing unit 4 includes the diaphragm 41, a first diaphragm electrode 42 defined on a surface of the diaphragm 41 facing the first board 2, and a second diaphragm electrode 43 defined on another surface of the diaphragm 41 facing the second board 3. With this arrangement, capacitance is generated between the first board electrode 22 of the first board 2 and the first diaphragm electrode 42 of the sensing unit 4, and capacitance is generated between the second board electrode 32 of the second board 3 and the second diaphragm electrode 43 of the sensing unit 4. The pressure detector 1 according to the exemplary embodiment is configured to detect a change in the capacitance between the first and second board electrodes and first and second diaphragm electrodes to detect a pressure applied on the diaphragm 41.

A thickened peripheral portion of the diaphragm 41 of the sensing unit 4 defines the bonding portion 44 bonded with the first board 2 and the second board 3. Specifically, the first board body 21 of the first board 2 is bonded to one surface of the bonding portion 44 of the sensing unit 4, and the second board body 31 of the second board 3 is bonded to the other surface of the bonding portion 44 of the sensing unit 4 in the exemplary embodiment.

It should be noted that the sensing unit 4 is not necessarily configured as described above. For instance, the sensing unit 4 is optionally made of insulative silicon or the like and is optionally provided with the first diaphragm electrode 42 on one side of the diaphragm 41 facing the first board 2, and the second diaphragm electrode 43 on the other side of the diaphragm 41 facing the second board 3. In other words, it is only necessary for the sensing unit 4 to be provided with the first diaphragm electrode 42 on the side of the diaphragm 41 facing the first board 2 and the second diaphragm electrode 43 on the side of the diaphragm 41 facing the second board 3.

Operation of Sensing Unit 4

Next, an operation of the sensing unit 4 will be described below.

When an excessive pressure or negative pressure is applied upward (in the figure) on the diaphragm 41 of the pressure detector 1 shown in FIG. 1, the diaphragm 41 is brought into contact with the first board electrode 22 provided on the first board body 21 as shown in FIG. 2. The diaphragm 41 is thus not excessively deformed, so that a damage on the diaphragm 41 is restrained.

Further, in the exemplary embodiment, the first board body 21 is provided with the first groove 24, which is in communication with the first pressure inlet 23, on the surface facing the first diaphragm electrode 42. Accordingly, the first groove 24 is kept in communication with the first pressure inlet 23 even when the diaphragm 41 and the first board electrode 22 are in contact as shown in FIG. 2, so that a closed space is restrained from being formed between the first diaphragm electrode 42 and the first board electrode 22. Thus, this restraint of the formation of the closed space can avoid the tight contact of the diaphragm 41 and the first board electrode 22 and consequent failure in immediate separation therebetween that are caused by the pressure difference between the closed space and an outside generated when the excessive pressure or negative pressure applied on the diaphragm 41 is released.

Similarly, the second groove 34 in communication with the second pressure inlet 33 is provided on the surface of the second board body 31 facing the second diaphragm electrode 43 in the exemplary embodiment. Accordingly, the tight contact of the diaphragm 41 and the second board electrode 32 and consequent failure in immediate separation therebetween, which are caused by the pressure difference between the closed space and an outside generated when the excessive pressure or negative pressure applied on the diaphragm 41 is released, can be prevented.

Advantage(s) of Exemplary Embodiment

The following advantages can be achieved by the above-described present exemplary embodiment.

(1) In the exemplary embodiment, the first board body 21 is provided with the first groove 24, which is in communication with the first pressure inlet 23, on the surface facing the first diaphragm electrode 42. Thus, even when an excessive pressure or negative pressure is applied on the diaphragm 41 through the first pressure inlet 23 or the second pressure inlet 33 to bring the first diaphragm electrode 42 of the diaphragm 41 into contact with the first board electrode 22 of the first board 2, the closed space between the first diaphragm electrode 42 and the first board body 21 provided with the first board electrode 22 can be prevented from being formed. Accordingly, failure in immediate separation of the first diaphragm electrode 42 from the first board electrode 22 and consequent deterioration in responsiveness can be restrained.

Similarly, in the exemplary embodiment, since the second groove 34 in communication with the second pressure inlet 33 is formed on the surface of the second board body 31 facing the second diaphragm electrode 43, the closed space between the second diaphragm electrode 43 and the second board body 31 provided with the second board electrode 32 can be prevented from being formed. Accordingly, failure in immediate separation of the second diaphragm electrode 43 from the second board electrode 32 and consequent deterioration in responsiveness can be restrained.

Further, in the exemplary embodiment, since the presence of a plurality of pressure inlets in each of the first board 2 and the second board 3 is not required, decrease in an effective electrode area by the plurality of pressure inlets and consequent deterioration in detection sensitivity can be restrained.

In addition, in the exemplary embodiment, the presence of the plurality of pressure inlets is not required, a sufficient bonding area is ensured even when the pressure detector 1 is miniaturized.

(2) In the exemplary embodiment, since the first groove 24 and the second groove 34 of the first board 2 and the second board 3, respectively, are covered with respective electrodes, the parts corresponding to the first groove 24 and the second groove 34 are also effective usable. Accordingly, decrease in effective electrode area due to the presence of the first groove 24 and the second groove 34 can be restrained.

(3) Since the first groove 24 and the second groove 34 of the exemplary embodiment are linearly formed, the formation of the first groove 24 and the second groove 34 is easy.

Modifications

It should be noted that the present invention is not limited to the above-described embodiment but includes modifications, improvements, and the like as long as an object of the invention can be achieved.

The first groove 24, which is a single groove formed in the first board body 21 in the exemplary embodiment, is not necessarily configured as described in the exemplary embodiment. For instance, the first groove is optionally a plurality of radial grooves formed in the first board body.

Similarly, the second groove 34, which is a single groove formed in the second board body 31 in the exemplary embodiment, is not necessarily configured as described in the exemplary embodiment. For instance, the second groove is optionally a plurality of radial grooves formed in the second board body.

Further, the groove is optionally formed in only one of the first board body and the second board body.

The first groove 24, which is a linear groove in the exemplary embodiment, is not necessarily configured as described in the exemplary embodiment. For instance, the first groove is curved in some embodiments. In other words, the first groove is configured in any manner as long as the first groove serves as a flow path capable of restraining the formation of the closed space between the first diaphragm electrode and the first board body when the first diaphragm electrode is in contact with the first board electrode.

Similarly, the second groove 34, which is a linear groove in the exemplary embodiment, is not necessarily configured as described in the exemplary embodiment. For instance, the second groove is curved in some embodiments. In other words, the second groove is configured in any manner as long as the second groove serves as a flow path capable of restraining the formation of the closed space between the second diaphragm electrode and the second board body when the second diaphragm electrode is in contact with the second board electrode.

The first pressure inlet 23, which is trapezoidal in cross section and is tapered from the outer side to the inner side in the exemplary embodiment, is not necessarily configured as described in the exemplary embodiment. For instance, the first pressure inlet is rectangular in cross section in some embodiments.

Similarly, the second pressure inlet 33, which is trapezoidal in cross section and is tapered from the outer side to the inner side in the exemplary embodiment, is not necessarily configured as described in the exemplary embodiment. For instance, the second pressure inlet is rectangular in cross section in some embodiments.

The first pressure inlet 23 and the first groove 24, which are covered with the first board electrode 22 in the exemplary embodiment, are not necessarily configured as described in the exemplary embodiment. For instance, the first pressure inlet and/or the first groove is not covered with an electrode in some embodiments of the invention.

Similarly, the second pressure inlet 33 and the second groove 34, which are covered with the second board electrode 32 in the exemplary embodiment, are not necessarily configured as described in the exemplary embodiment. For instance, the second pressure inlet and/or the second groove is not covered with an electrode in some embodiments of the invention.

What is claimed is:

1. A pressure detector comprising:
   a sensing unit comprising a plate-shaped diaphragm, a first diaphragm electrode provided on one surface of the diaphragm, a second diaphragm electrode provided on the other surface of the diaphragm, and a bonding portion provided on a peripheral portion of the diaphragm;
   a first board comprising a first board body shaped in a plate and bonded to one surface of the bonding portion of the sensing unit and a first board electrode provided on a surface of the first board body facing the first diaphragm electrode; and
   a second board comprising a second board body shaped in a plate and bonded to the other surface of the bonding portion of the sensing unit and a second board electrode provided on a surface of the second board body facing the second diaphragm electrode, wherein
   the first board body comprises a first pressure inlet penetrating through the first board body and a first groove that is a groove recessed in the surface of the first board body facing the first diaphragm electrode, the first groove being in communication with the first pressure inlet, and
   the second board body comprises a second pressure inlet penetrating through the second board body and a second groove that is a groove recessed in the surface of the second board body facing the second diaphragm electrode, the second groove being in communication with the second pressure inlet.

2. The pressure detector according to claim 1, wherein the first groove is covered with the first board electrode, and
   the second groove is covered with the second board electrode.

3. The pressure detector according to claim 1, wherein the first groove linearly extends from the first pressure inlet to a portion of the first board bonded with the bonding portion, and
   the second groove linearly extends from the second pressure inlet to a portion of the second board bonded with the bonding portion.

* * * * *